(12) United States Patent
Forehand et al.

(10) Patent No.: US 12,556,483 B2
(45) Date of Patent: Feb. 17, 2026

(54) DISTRIBUTING DATA AMONG DEVICES AT A LOCATION BASED ON DYNAMIC RULES

(71) Applicant: T-Mobile USA, Inc., Bellevue, WA (US)

(72) Inventors: Joseph Phillip Forehand, Denver, CO (US); Aziz Yunus Motiwala, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 81 days.

(21) Appl. No.: 18/296,942

(22) Filed: Apr. 6, 2023

(65) Prior Publication Data

US 2024/0340245 A1     Oct. 10, 2024

(51) Int. Cl.
*G06F 15/173*   (2006.01)
*H04L 47/24*   (2022.01)
*H04L 12/66*   (2006.01)

(52) U.S. Cl.
CPC .............. *H04L 47/24* (2013.01); *H04L 12/66* (2013.01)

(58) Field of Classification Search
CPC ................................ H04L 47/24; H04L 12/66
See application file for complete search history.

(56) References Cited

U.S. PATENT DOCUMENTS

| | | | |
|---|---|---|---|
| 8,516,121 B1 * | 8/2013 | Telang | H04L 41/0896 709/212 |
| 2013/0346564 A1 * | 12/2013 | Warrick | H04L 65/1045 709/219 |
| 2020/0026877 A1 * | 1/2020 | Dattatri | G06F 21/6254 |
| 2023/0308399 A1 * | 9/2023 | Eaton | H04L 47/822 |

* cited by examiner

*Primary Examiner* — Joseph R Maniwang
(74) *Attorney, Agent, or Firm* — Foley IP Law, PLLC

(57) ABSTRACT

A computerized method distributes data to devices associated with a local gateway using data distribution rules. Device data that identifies a first device and a second device of a local gateway is obtained and it is determined that the first device is a higher priority device using that device data. A data distribution rule is determined that prioritizes distribution of response data to the first device and that data distribution rule is assigned to a data plan profile associated with the local gateway. A first data request is received from the first device and a second data request is received from the second device. Response data is sent to the local gateway according to the data distribution rule, wherein response data to the first data request sent to the first device via the local gateway is prioritized over response data to the second data request sent to the second device.

20 Claims, 6 Drawing Sheets

DISTRIBUTING DATA AMONG DEVICES AT A LOCATION BASED ON DYNAMIC RULES

BACKGROUND

In settings where fixed wireless systems are used to provide network access, many different types of devices with various screen sizes vie for the same resources from a network gateway. Contention for such resources can result in poor performance by devices that require greater network bandwidth, such televisions or other devices that display 4K quality video.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for distributing data to devices associated with a local gateway using data distribution rules is described. Device data that identifies a first device and a second device of a local gateway is obtained and it is determined that the first device is a higher priority device using that device data. A data distribution rule is determined that prioritizes distribution of response data to the first device over the second device and that determined data distribution rule is assigned to a data plan profile associated with the local gateway. A first data request is received from the first device and a second data request is received from the second device. Response data is sent to the local gateway according to the assigned data distribution rule in response to the first data request and the second data request, wherein response data to the first data request sent to the first device via the local gateway is prioritized over response data to the second data request sent to the second device.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Figure 1:
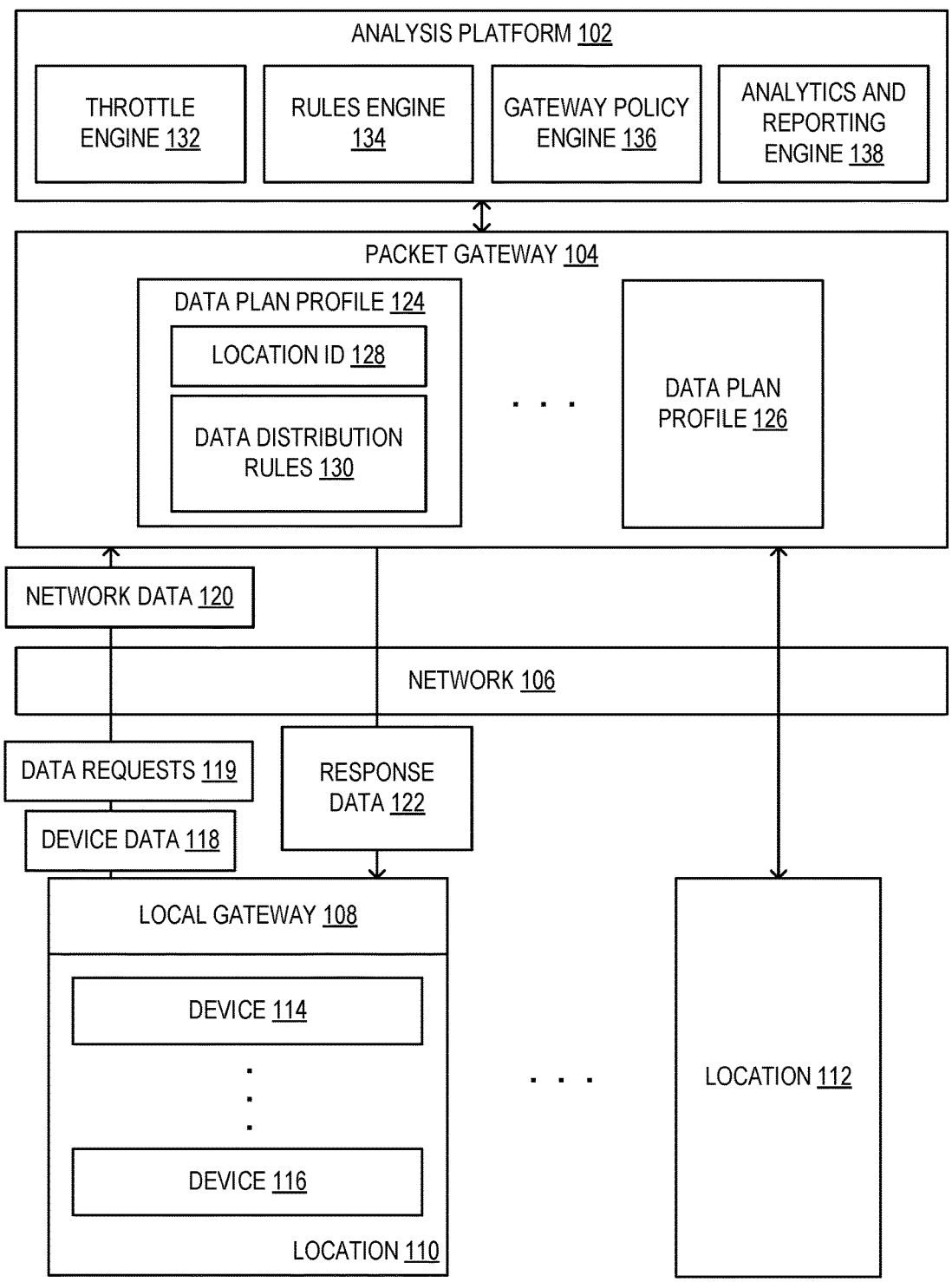
FIG. 1 is a block diagram illustrating an example system configured for distributing data to devices via a network using data distribution rules.

Aspects of the disclosure provide a system and method for distributing data to devices associated with a local gateway using data distribution rules that are based at least on capabilities of those devices. The disclosure is configured to identify and monitor the various devices that are connected to a local gateway and determine which devices are most likely to require higher levels of bandwidth to maintain good performance and/or provide a good user experience. For instance, devices with larger screens and/or greater capability to play high quality video often require higher levels of bandwidth than other devices on the network. Once such devices are determined, the disclosure determines data distribution rules that guarantee bandwidth for those devices or otherwise enhance the portion of bandwidth that those devices receive to reduce the likelihood that the devices' performance is hindered due to contention for bandwidth between devices. Further, in some examples, the data distribution rules are determined based on other factors, such as current performance of the network in general. The determined data distribution rules are assigned to the data plan profile of the account associated with the local gateway and then those assigned rules are enforced with respect to data that is sent to the local gateway and intended for the devices connected to the local gateway. In some examples, the enforcement of such rules is done at the packet gateway level, such that the local gateway does not need to perform any additional processing to enforce the rules. The result of such rules enforcement is that the reliability and/or performance of devices that use higher levels of bandwidth are enhanced and the user experience with those devices is improved.

The disclosure operates in an unconventional manner at least by gathering device data from devices associated with the local gateway and analyzing the device data at an analysis platform that is associated with the packet gateway. The reliability and performance improvements of devices associated with the local gateway are obtained without increasing the resource cost and/or usage by the local gateway itself, which often has relatively low amounts of processing resources and/or other resources available. The backend portion of the system has substantially greater quantities of resources to perform the described analysis and rule enforcement.

Additionally, the disclosure enables the described systems to dynamically update the data distribution rules in response to changes in the state of the system, such as the addition of new devices, the removal of devices from the system, and/or changes in the performance of the network. By dynamically adjusting the conditions and/or amount to which distribution of data is controlled and/or throttled by enforced data distribution rules, the disclosure enhances the reliability of high priority devices while minimizing the degree to which other devices are negatively affected by the enforcement of the data distribution rules.

FIG. 1 is a block diagram illustrating an example system 100 configured for distributing data (e.g., response data 122) to devices via a network 106 using data distribution rules 130. The system 100 includes an analysis platform 102 and a packet gateway 104 that are configured to receive device data 118, data requests 119, and/or other network data 120 via the network 106 and to generate and/or access distribution rules 130 for a data plan profile 124 associated with the local gateway 108 based on the received data. The analysis platform 102 and packet gateway 104 are further configured to provide or otherwise serve response data 122 in response to the data requests 119, using the data distribution rules 130 to control how the response data 122 is provided to the local gateway 108. Additionally, the local gateway 108 is configured to provide network connections to devices 114-116 (e.g., via a local Wi-Fi network) at the location 110 with which the local gateway 108 is associated.

Further, in some examples, the system 100 includes computing devices (e.g., the computing apparatus of FIG. 6) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the packet gateway 104 includes one or more computing devices that communicate with local gateway 108 over the network 106. Additionally, or alternatively, the analysis platform 102 and packet gateway 104 include a plurality of computing devices that are in communication with each other over one or more communication networks (e.g., the analysis platform 102 includes a plurality of computing devices that are distributed across a network). In still other examples, other organizations of computing devices are used to implement the system 100 without departing from the description.

In some examples, the packet gateway 104 enables devices at multiple locations 110-112 to send and receive data via the network 106. For instance, in an example, the packet gateway 104 enables devices at the locations 110-112 to access the Internet via fixed wireless connections. In such examples, the network connection between the packet gateway 104 and the local gateway 108 of the location 110 via the network 106 is a wireless data connection, such as a cellular network connection in which a cellular data tower communicates wirelessly with the local gateway 108. The local gateway 108 sends the device data 118, the data requests 119, network data 120, and/or other data to the packet gateway 104 via the network 106 using one or more cellular data towers and the packet gateway 104 provides, serves, and/or sends response data 122 to the local gateway 108 via the network 106 using the one or more cellular data towers.

The local gateway 108 connects with devices 114-116 at the location 110 and enables those devices 114-116 to send and receive data via the network 106. The devices 114-116 are connected to the local gateway 108 using wireless or wired network connections. For instance, in an example, the devices 114-116 include computers, such as personal computers or laptops, and/or other devices such as mobile phones, televisions, and/or other smart devices that are configured to use network connections. In such examples, the local gateway 108 includes or otherwise makes use of one or more wireless routers that establish a wireless network in the location 110 (e.g., a Wi-Fi network) to which the devices 114-116 connect. Further, in some examples, location 112 includes another local gateway that is configured to perform the operations described above with respect to devices in the location 112. Additionally, other locations in the system 100 also include other local gateways and devices without departing from the description.

The packet gateway 104 is configured to store data plan profiles 124-126 that are used to control and/or distribute data to local gateways and/or devices according to established data plans. In some examples, a data plan profile 124 is associated with the location 110 and the local gateway 108 at that location 110. This association is indicated by a location ID 128 in the data plan profile 124. In some examples, the location ID 128 includes an identifier of the local gateway 108 (e.g., a device ID or other identifier of the local gateway 108) and/or an identifier of a user that owns or otherwise has some control of the location 110 (e.g., an email address, username, or other identifier of a person that lives in a house at location 110). In some examples, the data plan profile 124 further includes data that indicates features of the data plan to which the local gateway 108, location 110, and/or any users thereof are subscribed or otherwise associated. For instance, in an example, the data plan profile 124 includes a maximum bandwidth limit of data sent to the local gateway 108, a minimum bandwidth limit that is guaranteed to the local gateway 108, a total quantity of data guaranteed to the local gateway 108 during a time period (e.g., 50 gigabytes (GB) of data per month), a price paid for network use during a time period, types of data that can be accessed, and/or other data plan features.

Further, in some examples, the data plan profile 124 includes data distribution rules 130 that are generated or otherwise accessed by the analysis platform 102 as described herein. The data distribution rules 130 are used by the packet gateway 104 to control distribution of response data 122 to specific devices 114-116 of the location 110. For instance, in an example, the device 114 is a higher priority device than the device 116 and the data distribution rules 130) include a data distribution rule that indicates that response data 122 directed to the device 114 be served by the packet gateway 104 at a guaranteed rate and that response data 122 directed to the device 116 be served by the packet gateway 104 at a best possible rate after bandwidth for data directed to the device 114 is used. More specifically, in an example, the device 114 is a television that is capable of displaying 4K quality video and the device 116 is a mobile device with a relatively small screen. The data distribution rule 130) indicates that the response data 122 directed to the device 114 be served at a rate that enables reliable transmission of 4K quality video data and that the response data 122 directed to the device 116 be served at a best rate possible after the bandwidth for response data 122 to the device 114 is used. Thus, the quality of the 4K video to the device 114 is protected at the potential cost of less quality or consistent data to the device 116. In other examples, the data distribution rules 130 are generated and/or configured to control the flow of response data 122 to the local gateway 108 and associated devices 114-116 in other ways without departing from the description. In some such examples, the data distribution rules 130 include rules that have been statically defined (e.g., a rule that is defined to reserve bandwidth needed to operate a common device during a common data use of that device) and/or rules that are dynamically generated (e.g., a rule that is generated to reserve an amount of bandwidth that is dynamically determined based on historic data use of the associated device).

In an example, a data distribution rule 130 is dynamically generated to protect or reserve an amount of bandwidth for use by a higher priority device during a common data use of that higher priority device (e.g., 25 Mbps of bandwidth is reserved for use by a television to display a 4K quality video stream). In scenarios where the location has plentiful bandwidth, such a data distribution rule 130 does not necessarily affect other devices that are also connected to the same local gateway 108. However, in scenarios where available bandwidth is more limited, the data distribution rule 130 described above or associated data distribution rules 130 are defined to throttle bandwidth that is available to other, lower priority, devices as a result of the reserved or protected bandwidth for use by the higher priority device. Additionally, or alternatively, in some examples, data distribution rules 130 are defined that throttle bandwidth to devices for other reasons, such as business rules (e.g., a customer X has crossed a 100 Gigabyte (GB) threshold for daily throughput and now has throttled bandwidth to the customer's devices for the next Y hours).

The packet gateway 104 is configured to receive device data 118 and associated data requests 119 from the local gateway 108 over the network 106 and/or network data 120 associated with the network 106 itself. In some examples, the device data 118 includes data that identifies the devices 114-116 and/or data that describes features of the devices 114-116. For instance, in an example, device data 118 includes device model data, device serial numbers, device manufacturer data, or other device identification data. Additionally, or alternatively, the device data 118 includes indicators of the type and/or quality of data the associated device is capable of consuming and/or data that can be used to determine the type and/or quality of the data the associated device is capable of consuming. For instance, in an example, the device data 118 includes a model number that identifies the device 114 as a television that is known to be capable of displaying 4K quality video.

In some examples, the device data 118 is automatically obtained by the local gateway 108 from the devices 114-116 when those devices first connect to the network provided by the local gateway 108. Alternatively, or additionally, data provided by the devices 114-116 in data requests 119 during operation of those devices is used as device data 118 for identifying those devices and their capabilities. For instance, as part of header data in a data request 119 from the device 114, device ID data is included that can be used to determine the model of the device 114. Further, in some such examples, the device data 118 includes only data that is obtained from the devices 114-116 during typical interactions with the local gateway 108 rather than the local gateway 108 specifically requesting the device data 118 for analysis and use in generating, evaluating, and/or enforcing the data distribution rules 130 as described herein.

Additionally, or alternatively, in some examples, the local gateway 108 is configured to store a local database or other data structure of device data 118 that it maintains over time as devices are connected and/or disconnected from the local gateway 108. For instance, in an example, when the device 116 is first connected to the local gateway 108, device data 118 provided to the local gateway 108 is stored in the local database of device data 118. The local gateway 108 then provides the device data 118 in the local database to the packet gateway 104 periodically, in response to requests, and/or based on the occurrence of other triggering events (e.g., each time a new device connects to the local gateway 108, the local gateway 108 sends an up-to-date data set of the locally stored device data 118 to the packet gateway 104).

The data requests 119 include any requests made by the devices 114-116 for data over the network 106. In some examples, a data request 119 from the device 114 is a request for a video from a video streaming website and/or a data request 119 from the device 116 is a request for access to an email website. In other examples, other types of data are requested via the data requests 119 without departing from the description. Further, in some examples, it should be understood that the data requests 119 from the devices 114-116 and the response data 122 provided to the devices 114-116 via the local gateway 108 describe interactions over time between the devices 114-116 and network data sources to which the packet gateway 104 provides access. For instance, in an example, a device 114 that is playing a streaming video is sending multiple data requests 119 associated with that streaming video over time and the data of the streaming video is provided to the device 114 as response data 122 as described herein.

The network data 120 describes a current state of the network 106 that enables communication between the devices 114-116 and local gateway 108 and the packet gateway 104. In examples where the network 106 is a wireless network (e.g., the packet gateway 104 and local gateway 108 are configured to operate as a fixed wireless system) and the performance of the network 106 varies dynamically over time, the network data 120 is collected or otherwise obtained periodically at the packet gateway 104. In some examples, the network data 120 is used by the analysis platform 102 when generating, evaluating, and/or enforcing the data distribution rules 130, such that the state of the network 106 can affect how the response data 122 is distributed to various devices 114-116 at the location 110. Further, in some examples, network data 120 includes data indicating current bandwidth levels of data transmissions to and from local gateways, data describing current contention for bandwidth between local gateways and/or devices associated therewith (e.g., detected instances of buffering, pausing, or low bitrate), data describing detected interference with communications over the network 106, or the like. In other examples, network data 120 includes more, fewer, and/or different types of data without departing from the description.

The analysis platform 102 includes hardware, firmware, and/or software configured to receive device data 118, network data 120, and/or other data, analyze the received data, and generate and/or enforce data distribution rules 130 and/or associated policies to manage the distribution of data to devices, such as devices 114-116, at locations, such as locations 110-112, that are being served by the system 100. In some examples, the analysis platform 102 interacts with the packet gateway 104 to enhance the user experience for devices 114-116 that are higher priority (e.g., devices that are capable of consuming higher quality video streams, such as 4K enabled televisions) through data distribution rules 130 that favor network traffic for those devices while resorting to best effort data distribution for other lower priority devices.

In some examples, the analysis platform 102 includes a throttle engine 132, a rules engine 134, a gateway policy engine 136, and an analytics and reporting engine 138. The throttle engine 132 is configured to evaluate the data distribution rules 130 for a local gateway 108 and determine whether and/or how to enforce those data distribution rules 130 with respect to the response data 122 being sent to the local gateway 108. For instance, in some examples, data distribution rules 130 include conditions or triggers for enforcement, such as a rule 130 that is enforced only when the current bandwidth that can be used with the local gateway 108 is less than a defined value or when a defined level, type, or degree of contention is detected among devices 114-116 associated with the local gateway 108. In an example where the device 114 is known to be a device that is frequently used to watch 4K video streamed over the network 106, a data distribution rule 130 is defined such that it is enforced when an instance of contention that affects the device 114 is detected and, when enforced, the data distribution rule 130 requires the response data 122 to include data directed to the device 114 at a sufficient bandwidth to maintain a high quality 4K video stream. Thus, the device 114 is favored by the data distribution rule 130, but the data distribution rule 130 is only active and enforced when a data contention that negatively affects the performance of the device 114 is first detected. Further, the data distribution rule 130 becomes inactive or is otherwise no longer enforced after a time period of enforcement and/or after a more favorable network state with less contention is detected. While the throttle engine 132 is illustrated as part of the analysis platform 102, it should be understood that, in some examples, the throttle engine 132 is part of or otherwise associated with the packet gateway 104 without departing from the description.

The rules engine 134 is configured to host some predefined data distribution rules 130, to provide an interface by which users can create, change, and/or remove data distribution rules 130 in the system 100, and to provide sets of the data distribution rules 130 to the throttle engine 132 for evaluation and enforcement.

The gateway policy engine 136 is configured to host gateway configuration code and/or associated data that can be used by the throttle engine 132 on the packet gateway 104 to enforce or otherwise apply data distribution rules 130 as described herein. Further, in some examples, the gateway policy engine 136 includes an interface that enables users to provide engineering updates to the stored gateway configuration code and/or associated data.

The analytics and reporting engine 138 is configured to host reporting and analytics data associated with the performance of operations by the analysis platform 102 and associated packet gateway 104 as described herein. The analytics and reporting engine 138 further provides an interface enabling users to review reports and/or associated analytics of the system operations, enabling them to make adjustments to other aspects of the system 100 to improve performance.

In some examples, users of the devices 114-116 at a location 110 are enabled to define data distribution rules 130 in an associated data plan profile 124. For instance, in an example, a user has several devices in their home and one of them is a computer that they use specifically for important work tasks that require reliable network access. The user is enabled to indicate that the computer used for work tasks should be treated as a higher priority device by defining a data distribution rule 130 and providing the rule 130 to the packet gateway 104 for recording in the data plan profile 124 of the user. Later, in situations where sufficient bandwidth may not be available for all devices at the user's home, the response data 122 to the work computer is prioritized by the packet gateway 104, enhancing the reliability and/or performance of network access to that computer.

Further, in some examples, the analysis platform 102 includes a model trained using machine learning (ML) techniques that is used to automatically analyze incoming data and to select relevant data distribution rules 130 based on that analysis. For instance, the model is trained using training pairs of input data sets (e.g., device data 118, data requests 119, and/or network data 120) and data distribution rules 130 that are to be enforced in association with the input data sets. The model is trained iteratively over time using large quantities of such training data pairs. For instance, in one iteration, a set of input data is provided to the model and the model generates a prediction value associated with a predicted data distribution rule 130 that indicates a degree of certainty that the predicted data distribution rule 130 is to be enforced as a result of the set of input data. The predicted data distribution rule 130 is evaluated with respect to the data distribution rule 130 that is part of the training pair. If the predicted data distribution rule 130 matches the data distribution rule 130 of the training pair, the model is adjusted such that the prediction value and associated predicted data distribution rule 130 is more likely to be generated in response to the same or similar input data. Alternatively, if the predicted data distribution rule 130 does not match the data distribution rule 130 of the training pair, the model is adjusted such that the prediction value and associated predicted data distribution rule 130 is less likely to be generated in response to the same or similar input data. Thus, the model is trained to receive a current set of input data and to provide a prediction or recommendation of a data distribution rule 130 that should be used based on that current set of input data. In other examples, more and/or different ML models are used in the analysis platform 102 without departing from the description.

In some examples, at least a portion of the data obtained from devices 114-116 and/or the local gateway 108 includes personal identifiable information (PII) or other data for which there are privacy concerns. In such examples, the system 100 is configured to protect such information by anonymizing data associated with devices 114-116 whenever possible. For instance, in an example, PII or other associated data is stripped from the device data 118 and/or data requests 119 at the local gateway 108 prior to being transmitted over the network 106 to prevent that data from being intercepted or otherwise compromised. Additionally, or alternatively, device data 118 values that may be private or otherwise sensitive are mapped to anonymous values which are used within the system 100 to reduce the exposure of that data during the operations described herein. In other examples, more and/or different data protection measures are taken by components of the system 100 without departing from the description.

Figure 2:
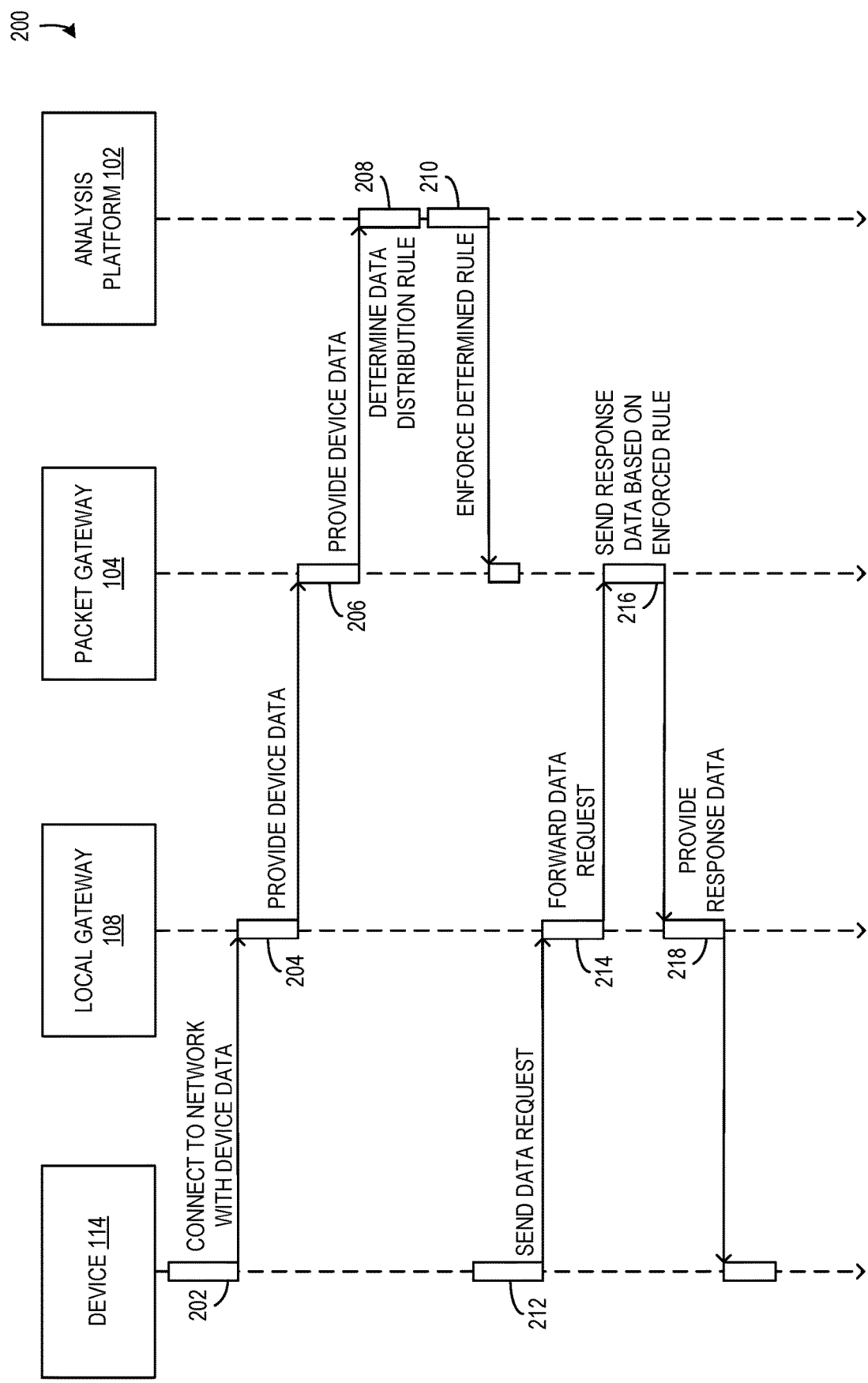
FIG. 2 is a sequence diagram illustrating an example process for distributing data using a data distribution rule that is determined based on device data.

FIG. 2 is a sequence diagram illustrating an example process 200 for distributing data using a data distribution rule that is determined based on device data. In some examples, the process 200 is executed or otherwise performed in a system such as system 100 of FIG. 1.

At 202, the device 114 connects to the network provided by the local gateway 108 using device data that identifies and/or is otherwise specific to the device 114. In some examples, the local gateway 108 provides a wired or wireless network to multiple devices in a location (e.g., location 110) and the device 114 connects to that network by requesting access from the local gateway 108 and providing device information (e.g., device data 118) such as data identifying the model of the device 114 and/or data identifying the device 114 specifically. Further, in some examples, the device data provided to the local gateway 108 includes other data, such as data that enables the local gateway 108 to communicate with the device 114 over the established network (e.g., network address data of the device 114). Alternatively, or additionally, the local gateway 108 enables the connection of the device 114 to the network by providing the device 114 data such as data that enables secure network communication through encryption, data that provides the device 114 with an assigned address in the network, or the like.

At 204, the local gateway 108 provides the device data to the packet gateway 104 and at 206, the packet gateway 104 provides the device data to the analysis platform 102. In some examples, providing the device data by the local gateway 108 to the packet gateway 104 and the analysis platform 102 is triggered or caused by the device 114 connecting to the network. Alternatively, or additionally, the local gateway 108 provides the device data to the packet gateway 104 and analysis platform 102 periodically or based on the occurrence of another event. Further, in some examples, the device data includes the device data of the device 114 and device data associated with other devices that are also connected to the network through the local gateway 108, such that the provided device data is representative of all the devices that are currently using the local gateway 108 to access data over the associated network.

At 208, the analysis platform 102 determines a data distribution rule using the provided device data and, at 210, the analysis platform 102 causes the determined data distribution rule to be enforced by the packet gateway 104. In some examples, the determination of the data distribution rule includes determining that the device 114 is a higher priority than other devices connected to the local gateway 108 or that the device 114 is a lower priority than other devices connected to the local gateway 108. In some such examples, the data distribution rule that is determined at 208 favors the bandwidth of response data sent to a higher priority device over the bandwidth of response data sent to a lower priority device when the total amount of available bandwidth is insufficient for both devices or in scenarios where the sending of response data is otherwise being affected (e.g., if weather conditions or other events are interfering with effective signal transmission between the packet gateway 104 and the local gateway 108). For instance, in an example, the device 114 is determined to be a television that is capable of displaying 4K quality video and such a video stream requires a bandwidth of 25 Megabits per second (Mbps). Other devices connected to the local gateway 108 do not have such capabilities and/or are not typically used for displaying such high-quality video (e.g., based on usage history of those devices, which is provided to the analysis platform 102). The analysis platform 102 determines that a data distribution rule that guarantees that response data be provided to the device 114 at a minimum of 25 Mbps if at all possible be enforced to protect the quality of the video being shown on device 114. The determined rule is provided to the packet gateway 104, which is configured to enforce the rule when sending response data to the local gateway 108. Enforcement of such a rule is described below.

At 212, the device 114 sends a data request to the local gateway 108 and, at 214, the data request is forwarded to the packet gateway 104. The packet gateway 104 is configured to obtain requested data from other entities, such as other websites that are accessible via the Internet, or the like. The obtained response data to the data request is then sent back to the local gateway 108 at 216. To enforce the determined rule, the packet gateway 104 controls the rate at which packets intended for various devices, including the device 114, are sent to the local gateway 108. Thus, the local gateway 108 need not do any additional processing to enforce the determined data distribution rule. Rather, the local gateway 108 provides the response data it receives to the target devices. At 218, response data intended for the device 114 is received by the local gateway 108 and then provided to the device 114.

In the example above, the enforced data distribution rule requires that the device 114 receive response data at a minimum rate of 25 Mbps. To enforce the rule, the packet gateway 104 sends response data intended for the device 114 to the local gateway 108 at that rate or higher when the packet gateway 104 has response data to send. If the packet gateway 104 has response data to send that is intended for several different devices including the device 114 and the current state of the network enables the transmission of data at 35 Mbps from the packet gateway 104 to the local gateway 108, the packet gateway 104 uses 25 Mbps of that 35 Mbps of bandwidth to send response data intended for the device 114, while response data intended for other devices associated with the local gateway 108 is sent using the remaining 10 Mbps. The enforcement of such a rule may cause issues with those other devices if, for instance, they are also trying to obtain video data or other types of data at relatively high rates, but the enforced data distribution rule is configured to protect the rate of the response data provided to the device 114 at the possible expense of the response data rate to those other devices.

It should be understood that, in examples where the response data intended for the device 114 during a particular period cannot fully occupy the required 25 Mbps, the packet gateway 104 is enabled to use portions of that available bandwidth to send response data intended for other devices. Further, in examples where the total available bandwidth is less than the required 25 Mbps, the packet gateway 104 is configured to provide the response data to the local gateway 108 as well as possible, even though the data distribution rule cannot technically be satisfied.

Figure 3:
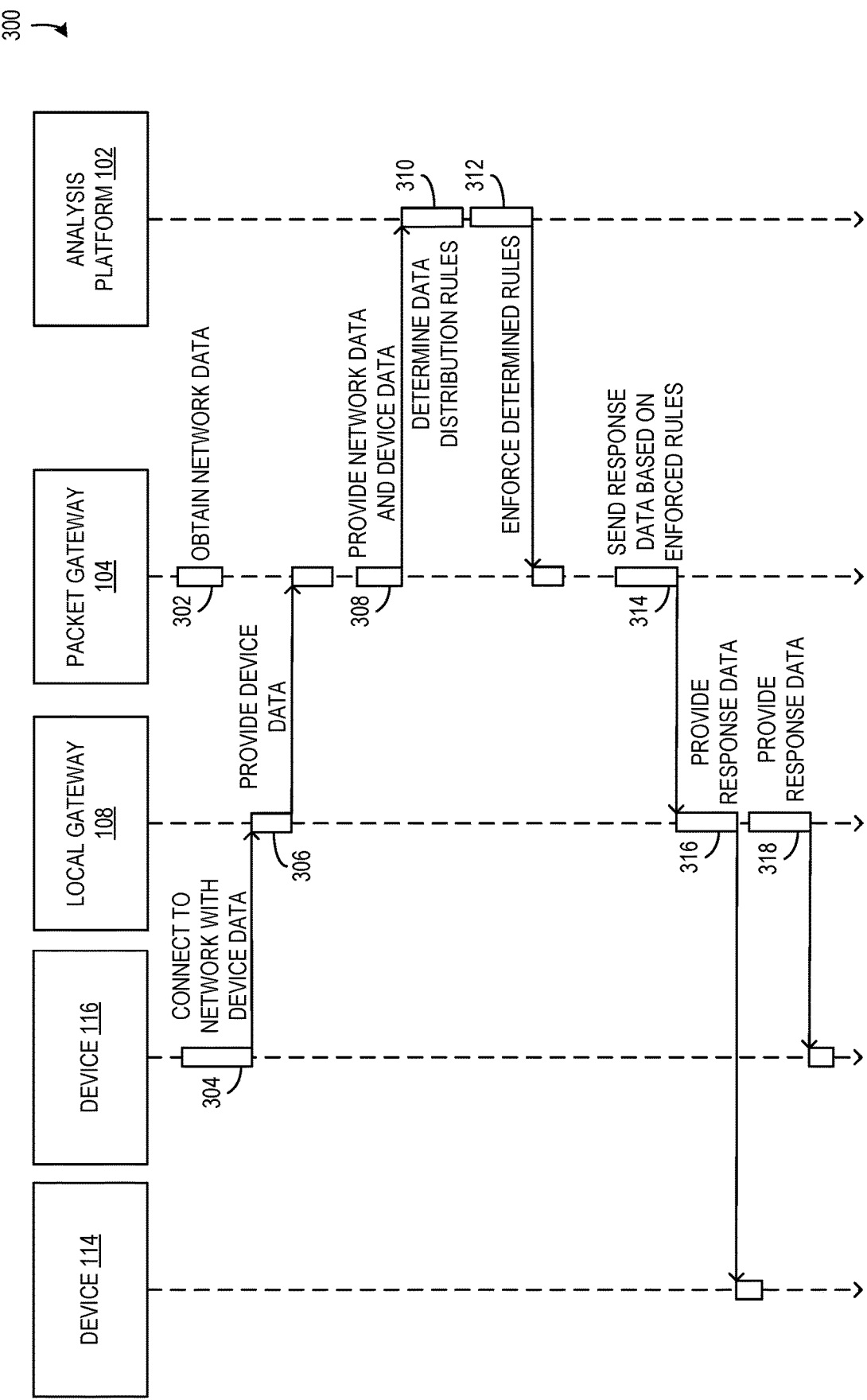
FIG. 3 is a sequence diagram illustrating an example process for distributing data to multiple devices using a data distribution rule that is determined based on network data and device data.

FIG. 3 is a sequence diagram illustrating an example process 300 for distributing data to multiple devices 114-116 using data distribution rules that are determined based on network data and device data. In some examples, the process 300 is executed or otherwise performed in a system such as system 100 of FIG. 1.

At 302, the packet gateway 104 obtains network data (e.g., network data 120). In some examples, the packet gateway 104 collects the network data based on observed timing and/or performance of communications between the packet gateway 104 and local gateways such as the local gateway 108. Additionally, or alternatively, the packet gateway 104 obtains the network data from the local gateway 108 as a result of receiving messages indicating that one or more devices 114-116 associated with the local gateway 108 are experiencing contention issues. The network data is obtained by the packet gateway 104 periodically and/or in response to an event (e.g., receiving a notification of contention between devices connected to the network).

At 304, the device 116 connects to the network associated with the local gateway 108 using device data that identifies or is otherwise associated with the device 116 and, at 306, the device data is provided to the packet gateway 104. In some examples, the process 300 occurs after the process 200 described above, such that the device 114 is already connected to the network of the local gateway 108. Further, it should be understood that, in some such examples, the process of the device 116 connecting to the network of the local gateway 108 is substantially the same as the device 114 connecting to the network of the local gateway 108 at 202 as described above.

At 308, the packet gateway 104 provides the obtained network data and the device data to the analysis platform 102. In some examples, the provided device data includes only the device data of the device 116. Alternatively, in other examples, the provided device data includes the device data of the device 116 and the device data of the device 114, which is already connected to the network of the local gateway 108.

At 310, the analysis platform 102 analyzes the network data and the device data to determine data distribution rules and, at 312, the analysis platform 102 provides the determined rules to the packet gateway 104 and/or otherwise causes the packet gateway 104 to enforce the determined rules. In some examples, determining the data distribution rules is based on both the network data and the device data. For instance, in an example where the network data indicates that there are widespread issues causing severely limited bandwidth, the analysis platform 102 determines that data distribution rules requiring specific, high rates of bandwidth be provided to high priority devices would result in other devices receiving no bandwidth. In some such examples, other types of data distribution rules are determined for use, such as rules that required that defined percentages of available bandwidth be provided to high priority devices (e.g., a high priority device is provided data using 60% of available bandwidth while other devices are provided data using the remaining 40%). While such rules may not as effectively protect the quality of the experience of using higher priority devices, other devices will still receive some response data, rather than none. In other examples, other types of data distribution rules are determined for use based on network data and device data without departing from the description.

At 314, the packet gateway 104 sends response data to the local gateway 108 based on the enforced data distribution rules. At 316 and 318, the local gateway 108 provides response data to the device 114 and the device 116, respectively. As described above, in some examples, the rate at which the response data is provided to each device is affected by data distribution rules as enforced by the packet gateway 104. It should be understood that, although data requests are not illustrated, in some examples, the devices 114 and 116 send data requests to the local gateway 108 as described herein and the response data is provided in response to those data requests. Further, it should be understood that the devices 114 and 116 send multiple data requests over time and that response data is provided to those data requests over time as well. Additionally, in some examples, the packet gateway 104 obtains new or updated network data and/or device data from local gateway 108 over time during performance of the process 300 and, as a result of the new or updated data, the analysis platform 102 is configured to determine whether the currently enforce data distribution rules should continue to be enforced and/or whether different data distribution rules should be enforced, as described herein.

Figure 4:
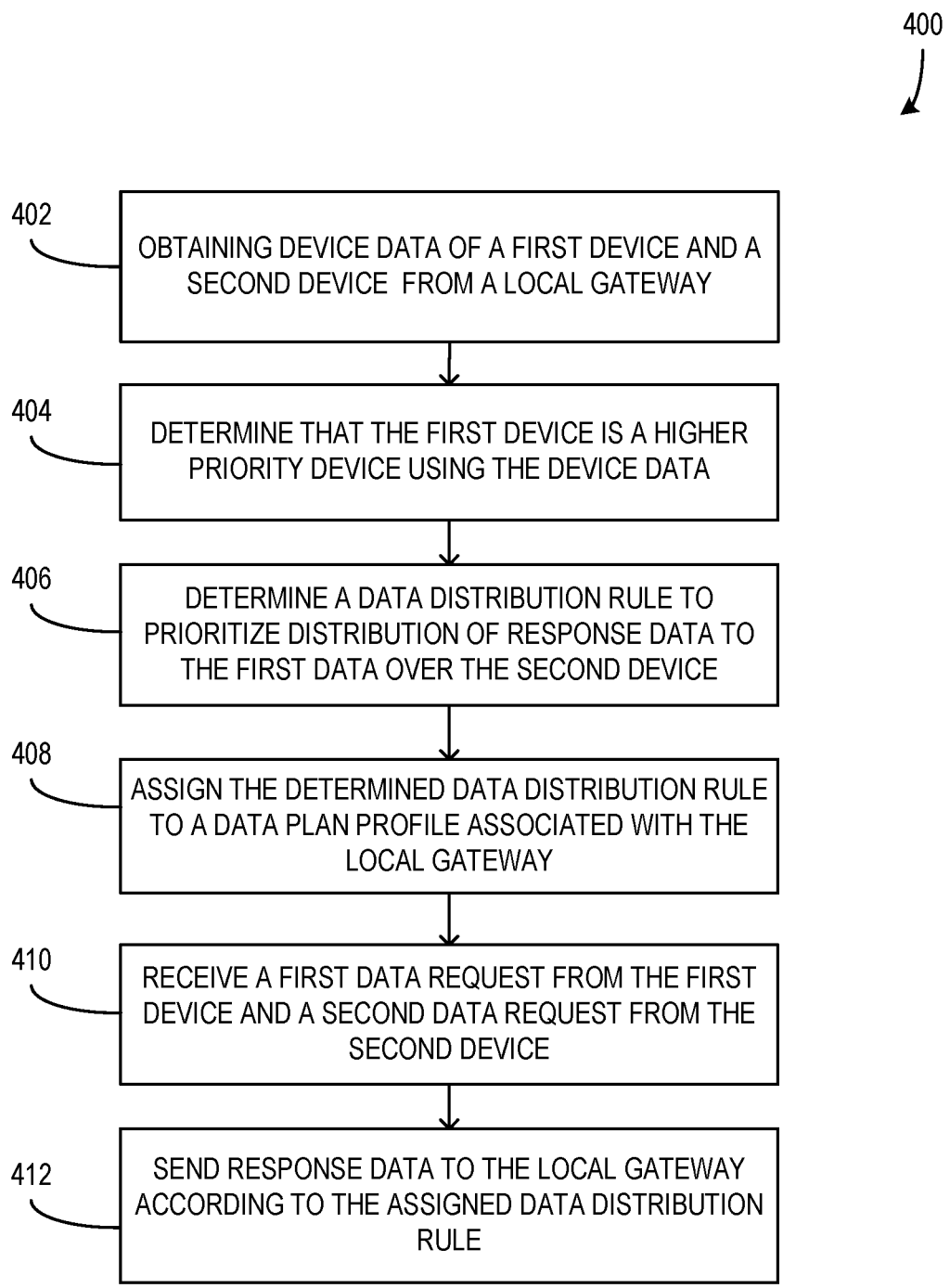
FIG. 4 is a flowchart illustrating an example method for distributing data to devices of a local gateway based on a data distribution rule.

FIG. 4 is a flowchart illustrating an example method 400 for distributing data (e.g., response data 122) to devices (e.g., devices 114-116) of a local gateway (e.g., local gateway 108) based on a data distribution rule (e.g., data distribution rule 130). In some examples, the method 400 is executed or otherwise performed in a system such as system 100 of FIG. 1. For instance, in an example, the method 400 is performed by an analysis platform 102 and/or packet gateway 104 in a system 100.

At 402, device data of a first device and a second device is obtained from a local gateway. The device data identifies the first device and the second device. In some examples, the device data includes data that describes the models of the devices, data that describes configuration aspects, features, and/or capabilities of the devices, such as a screen size of a television or other similar device, and/or data that describes past data usage of the devices. Further, in some examples, the device data indicates the occurrence of events associated with the devices, such as contention for bandwidth between the first device and the second device. Additionally, or alternatively, the device data includes other types of data without departing from the description.

At 404, it is determined that the first device is a higher priority device than the second device using the device data. In some examples, the determination that the first device is higher priority is done by an analysis platform 102. Further, in some examples, the determination that the first device is higher priority is based on the first device having a large screen and/or otherwise having a capability to play video that requires relatively high bandwidth (e.g., 4K quality video). Additionally, or alternatively, the determination that the first device is higher priority is based on a history of the first device being frequently used to view or otherwise access data that requires relatively high bandwidth.

At 406, a data distribution rule is determined that prioritizes distribution of response data to the first device over the second device. In some examples, the determination of the data distribution rule is done by an analysis platform 102. Further, in some examples, the determination of the data distribution rule includes identifying a defined rule template that is configured for use with a single higher priority device relative to one or more other lower priority devices and that requires that the higher priority device receive a defined level of bandwidth if at all possible while the rule is enforced. Then, the data distribution rule is determined from the rule template by defining the first device as the higher priority device in the rule template and defining the second device as one of the lower priority devices in the template. Additionally, or alternatively, determining the data distribution rule includes determining a minimum bandwidth value for the higher priority device based on past data use by the device and setting the required bandwidth of the data distribution rule to that determined bandwidth value. For instance, as described in an example above, if the first device requires a minimum of 25 Mbps to display 4K quality video with good performance, the data distribution rule is defined to require that the first device be provided response data at a 25 Mbps rate if at all possible while the data distribution rule is being enforced.

At 408, the determined data distribution rule is assigned to a data plan profile (e.g., data plan profile 124) associated with the local gateway. In some examples, the data plan profile is stored and/or maintained in or otherwise in association with a packet gateway that is configured to communicate with the local gateway as described herein. Further, in some examples, the data plan profile is associated with a user or users of the devices at the location that is served by the local gateway (e.g., a user's data plan that provides network connectivity to devices in their home).

At 410, a first data request is received from the first device and a second data request is received from the second device. In some examples, the first and second devices each send requests repeatedly and/or periodically throughout their normal operation (e.g., a television that requests video streaming data periodically as it plays video to a user and/or a personal computer that requests website data as a user uses it to view various websites).

At 412, response data is sent to the local gateway according to the assigned data distribution rule and in response to the first data request and the second data request. In some examples, the response data is sent to the local gateway by a packet gateway 104. The response data packets include indicators of the devices to which they are directed (e.g., a destination internet protocol (IP) address of the destination device) and the packet gateway 104 is configured to enforce the assigned data distribution rule based on those indicators. For instance, in an example, the data distribution rule requires that the first device be sent response data at 25 Mbps if possible, so the packet gateway 104 sends response data packets intended for the first device to the local gateway at a rate of at least 25 Mbps. The packet gateway 104 also sends data packets intended for the second device to the local gateway, but at a "best effort" rate that does not interfere with the required 25 Mbps of response data being sent to the first device.

In some examples, the data distribution rule is configured to protect the first device from future performance reductions due to contention with the second device. Thus, when the data distribution rule is enforced while sending response data to the local gateway, the response data intended for the first device is sent at a rate that reduces the likelihood of a performance reduction (e.g., the 25 Mbps rate described above).

Further, in an example, more device data is obtained that identifies a third device associated with the local gateway. The device data of the third device is obtained during the process of the third device connecting to the local gateway. The device data of the third device is analyzed in combination with the device data of the first and second devices and a second data distribution rule is determined using that combined device data. The second data distribution rule is assigned to the data plan profile associated with the local gateway and response data is distributed among the first device, second device, and third device via the local gateway according to the assigned second data distribution rule. In some examples, the second data distribution rule replaces the first data distribution rule while, in other examples, the second data distribution rule is added to the first data distribution rule such that they are both enforced during the sending of response data to the local gateway.

Additionally, or alternatively, in some examples, network data (e.g., network data 120) is obtained that is associated with network communications to and from the local gateway. In such examples, the network data is analyzed with the device data to determine a data distribution rule, such that the determined data distribution rule is defined to operate within limitations of a current state of the network communications with the local gateway.

Figure 5:
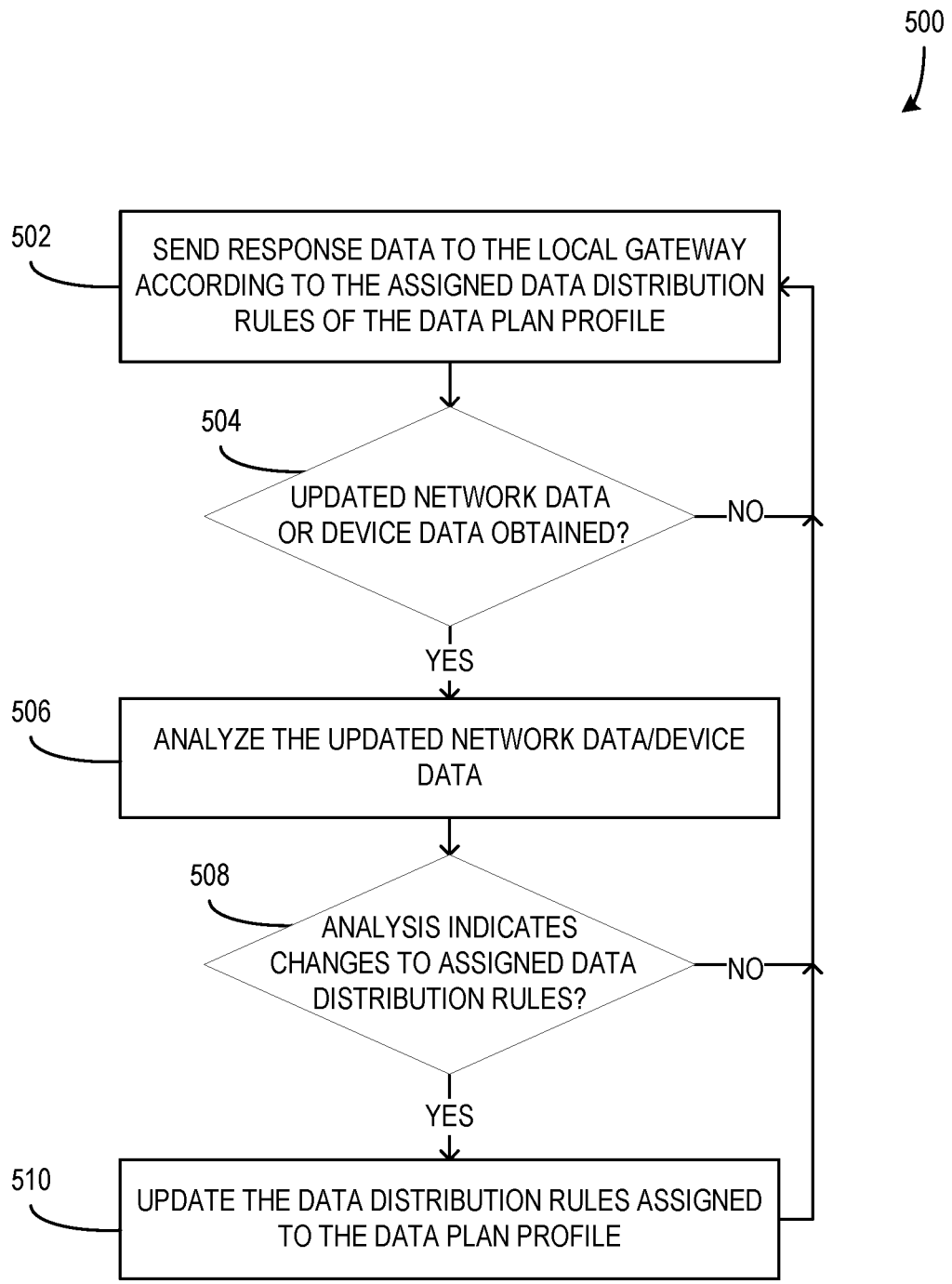
FIG. 5 is a flowchart illustrating an example method for distributing data to devices of a local gateway based on dynamically updated data distribution rules.

FIG. 5 is a flowchart illustrating an example method 500 for distributing data (e.g., response data 122) to devices (e.g., devices 114-116) of a local gateway (e.g., local gateway 108) based on dynamically updated data distribution rules (e.g., data distribution rules 130). In some examples, the method 500 is executed or otherwise performed in a system such as system 100 of FIG. 1. For instance, in an example, the method 500 is performed by an analysis platform 102 and/or packet gateway 104 in a system 100.

At 502, response data is sent to the local gateway according to assigned data distribution rules of the data plan profile associated with the local gateway. It should be understood that, at 502, a method for establishing the assigned data distribution rules, such as method 400 described above, has already been performed. The response data sent to the local gateway is intended for a plurality of devices that are connected to the local gateway, as described herein.

At 504, if updated network data and/or device data has been obtained, the process proceeds to 506. Alternatively, if no updated network data and/or device data has been obtained, then the process returns to 502 to continue distributing data according to the currently assigned data distribution rules. Alternatively, or additionally, in some examples, assigned data distribution rules have times at which they expire, such that the assigned data distribution rules are updated by removing expired rules even if no updated network data or device data is obtained.

At 506, the updated network data and/or device data is analyzed (e.g., by an analysis platform 102) and, at 508, if the analysis indicates that changes are to be made to the assigned data distribution rules, the process proceeds to 510. Alternatively, if the analysis does not indicate changes are to be made to the assigned data distribution rules, the process returns to 502.

At 510, the assigned data distribution rules are updated based on the results of the analysis at 506. For instance, in an example, the analysis indicates that a new high priority device has connected to the local gateway so a new data distribution rule that prioritizes sending response data to the new device is included in the assigned data distribution rules. Alternatively, or additionally, the analysis indicates that the available bandwidth of the network is reduced due to some interference and, as a result, the assigned data distribution rules are adjusted to account for the lower quantity of available bandwidth. After the data distribution rules are updated, the process returns to 502, where response data is sent to the local gateway according to the updated data distribution rules. In this way, the method 500 describes the dynamic update of the data distribution rules during the operation of a system such as system 100 of FIG. 1.

Exemplary Operating Environment

Figure 6:
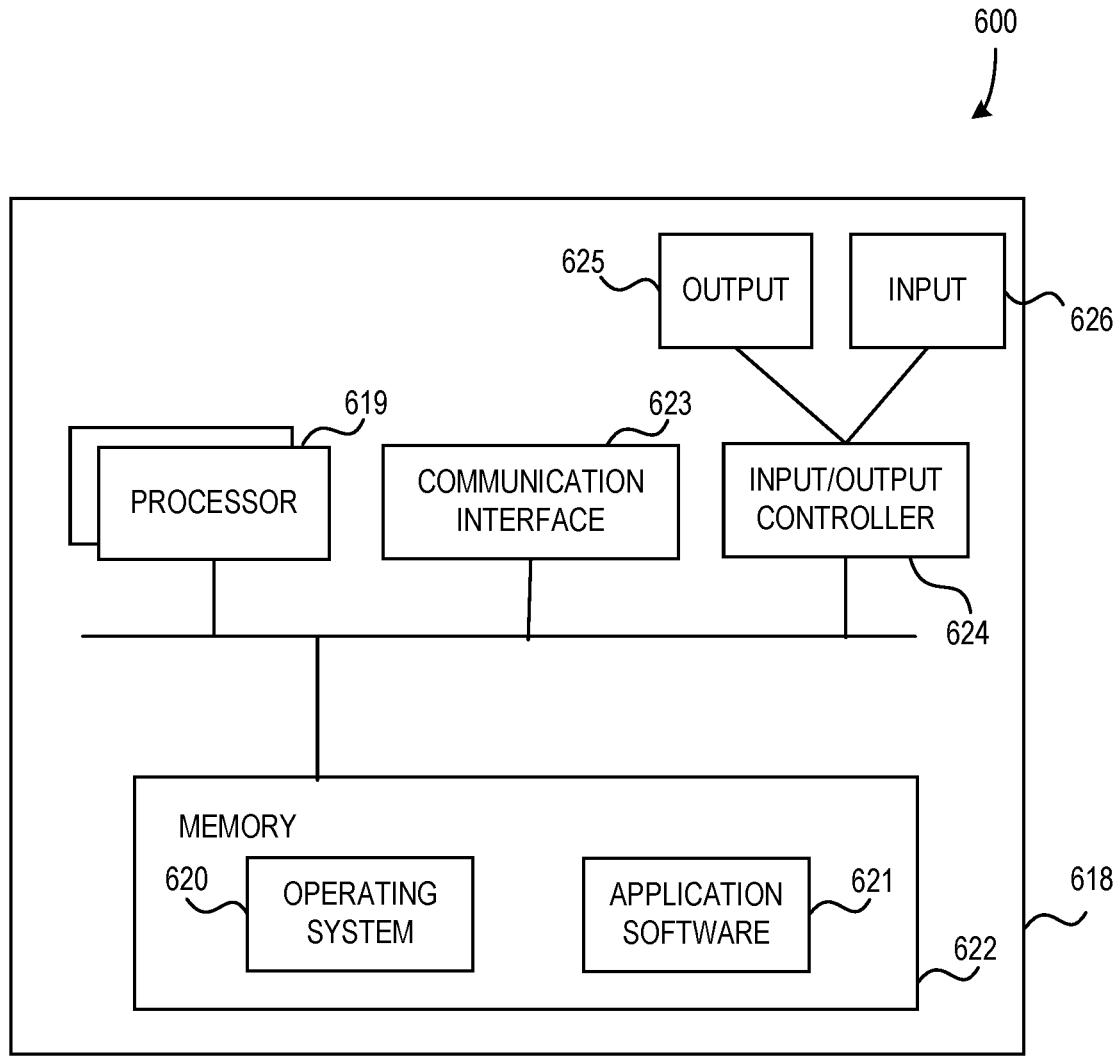
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, monitoring changes to devices and network state and dynamically updating data distribution rules for distributing data to the devices at the packet gateway level as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to cause the processor to: obtain device data from a local gateway, the device data identifying a first device and a second device associated with the local gateway; determine that the first device is a higher priority device using the device data; determine a first data distribution rule to prioritize distribution of response data to the first device over the second device; assign the determined first data distribution rule to a data plan profile associated with the local gateway; receive a first data request from the first device and a second data request from the second device; and send response data to the local gateway according to the assigned first data distribution rule in response to the first data request and the second data request, wherein response data to the first data request sent to the first device via the local gateway is prioritized over response data to the second data request sent to the second device.

An example computerized method comprises: obtaining device data from a local gateway, the device data identifying a first device and a second device associated with the local gateway; determining that the first device is a higher priority device using the device data; determining a first data distribution rule to prioritize distribution of response data to the first device over the second device; assigning the determined first data distribution rule to a data plan profile associated with the local gateway; receiving a first data request from the first device and a second data request from the second device; and sending response data to the local gateway according to the assigned first data distribution rule in response to the first data request and the second data request, wherein response data to the first data request sent to the first device via the local gateway is prioritized over response data to the second data request sent to the second device.

One or more computer storage media having computer-executable instructions that, upon execution by a processor, cause the processor to at least: obtain device data from a local gateway, the device data identifying a first device and a second device associated with the local gateway; determine that the first device is a higher priority device using the device data; determine a first data distribution rule to prioritize distribution of response data to the first device over the second device; assign the determined first data distribution rule to a data plan profile associated with the local gateway; receive a first data request from the first device and a second data request from the second device; and send response data to the local gateway according to the assigned first data distribution rule in response to the first data request and the second data request, wherein response data to the first data request sent to the first device via the local gateway is prioritized over response data to the second data request sent to the second device.

Alternatively, or in addition to the other examples described herein, examples include any combination of the following:
- wherein the device data includes data indicating uses of data by the first device and the second device; and wherein determining that the first device is a higher priority device includes determining that the first device uses data at a higher rate than the second device.
- wherein the device data includes one or more of the following: data indicating models of the first device and the second device, data describing past data uses by the first device and the second device, and data indicating screen sizes of the first device and the second device.
- further comprising: obtaining network data associated with network communications to and from the local gateway; wherein determining the first data distribution rule includes determining the first data distribution rule using the obtained network data.
- wherein the obtained network data includes data indicating a current available bandwidth of network communications to the local gateway; and wherein the determined data distribution rule includes distributing data to the first device at a rate that is a percentage value of the current available bandwidth.
- further comprising: obtain device data identifying a third device associated with the local gateway, the device data identifying the third device is obtained from the third device as the third device connects to the local gateway; determine a second data distribution rule using the device data identifying the first device and the second device and the device data identifying the third device; assign the second data distribution rule to the data plan profile associated with the local gateway; and send response data to the local gateway according to the assigned second data distribution rule, wherein response data is distributed to the first device, the second device, and the third device based on the assigned second data distribution rule.
- wherein the device data indicates contention for bandwidth between the first device and the second device caused a performance reduction for the first device; wherein determining the first data distribution rule includes determining the first data distribution rule that protects the first device from future performance reductions due to contention with the second device; and wherein the response data to the first data request sent to the first device via the local gateway is sent at a rate that reduces a likelihood of a performance reduction.
- wherein determining the first data distribution rule to reserve bandwidth for distribution of the response data to the first device includes: providing the obtained device data to a machine learning (ML)-trained model; and generating, with the ML-trained model, the determined first data distribution rule using the provided device data as input.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining device data from a local gateway, the device data identifying a first device and a second device associated with the local gateway; exemplary means for determining that the first device is a higher priority device using the device data; exemplary means for determining a first data distribution rule to prioritize distribution of response data to the first device over the second device; exemplary means for assigning the determined first data distribution rule to a data plan profile associated with the local gateway; exemplary means for receiving a first data request from the first device and a second data request from the second device; and exemplary means for sending response data to the local gateway according to the assigned first data distribution rule in response to the first data request and the second data request, wherein response data to the first data request sent to the first device via the local gateway is prioritized over response data to the second data request sent to the second device.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory comprising computer program code, the memory and the computer program code configured to cause the processor to:
   obtain device data from a local gateway, wherein the device data identifies a first device and a second device associated with the local gateway;
   remove personal identifiable information from the device data;
   determine that the first device is a higher priority device using the device data;
   determine a first data distribution rule to prioritize distribution of response data to the first device over the second device;
   assign the first data distribution rule to a data plan profile associated with the local gateway;
   receive a first data request from the first device and a second data request from the second device;
   send the response data to the local gateway according to the first data distribution rule in response to the first data request and the second data request, wherein a first portion of the response data to the first data request sent to the first device via the local gateway is prioritized over a second portion of the response data to the second data request sent to the second device; and
   dynamically update the first data distribution rule based on a change in the device data, wherein the change in the device data includes determining from network data, an occurrence of a contention event.

2. The system of claim 1, wherein the device data includes information indicating data uses by the first device and the second device; and
   wherein determining that the first device is the higher priority device includes determining that a first indicated data use of the first device requires a higher data rate than a second indicated data use of the second device.

3. The system of claim 2, wherein the device data includes one or more of: model information of the first device and the second device, device history data of the first device and the second device, and configuration information of the first device and the second device.

4. The system of claim 1, wherein the memory and the computer program code configured to cause the processor to:
   obtain the network data, wherein the network data is associated with network communications to and from the local gateway, a wherein determining the first data distribution rule includes determining the first data distribution rule using the network data.

5. The system of claim 4, wherein the network data includes data indicating a current available bandwidth of the network communications to the local gateway, and wherein the first data distribution rule includes distributing the first portion of the response data to the first device at a rate that is a percentage value of the current available bandwidth.

6. The system of claim 1, wherein the memory and the computer program code configured to cause the processor to:
   obtain updated device data identifying a third device associated with the local gateway, the updated device data identifying the third device is obtained from the third device as the third device connects to the local gateway;
   determine a second data distribution rule using the device data identifying the first device and the second device and the updated device data identifying the third device;
   assign the second data distribution rule to the data plan profile associated with the local gateway; and
   send additional response data to the local gateway according to the second data distribution rule, wherein the additional response data is distributed to the first device, the second device, and the third device based on the second data distribution rule.

7. The system of claim 1, wherein the device data indicates contention for bandwidth between the first device and the second device caused a performance reduction for the first device;
   wherein determining the first data distribution rule includes determining the first data distribution rule that protects the first device from future performance reductions due to future contentions with the second device; and
   wherein the response data to the first data request sent to the first device via the local gateway is sent at a rate that reduces a likelihood of a future performance reduction.

8. A computerized method comprising:
   obtaining device data from a local gateway, wherein the device data identifies a first device and a second device associated with the local gateway;
   removing personal identifiable information from the device data;
   determining that the first device is a higher priority device using the device data;
   determining a first data distribution rule to reserve bandwidth for distribution of response data to the first device;
   assigning the first data distribution rule to a data plan profile associated with the local gateway;
   receiving a first data request from the first device and a second data request from the second device;
   sending the response data to the local gateway according to the first data distribution rule in response to the first data request and the second data request, wherein a portion of available bandwidth for sending the response data is reserved for sending a first portion of the response data to the first data request to the first device via the local gateway; and dynamically updating the first data distribution rule based on a change in the device data, wherein the change in the device data includes determining from network data, an occurrence of a contention event.

9. The computerized method of claim 8, wherein the device data includes information indicating data uses by the first device and the second device; and wherein determining that the first device is the higher priority device includes determining that a first indicated data use of the first device requires a higher data rate than a second indicated data use of the second device.

10. The computerized method of claim 9, wherein the device data includes one or more of: model information of the first device and the second device, device history data of the first device and the second device, and configuration information of the first device and the second device.

11. The computerized method of claim 8, further comprising:

obtaining the network data associated with network communications to and from the local gateway;

wherein determining the first data distribution rule includes determining the first data distribution rule using the network data.

12. The computerized method of claim 11, wherein the network data includes data indicating a current available bandwidth of the network communications to the local gateway; and wherein the first data distribution rule includes distributing the first portion of the response data to the first device at a rate that is a percentage value of the current available bandwidth.

13. The computerized method of claim 8, further comprising:

obtain updated device data identifying a third device associated with the local gateway, the updated device data identifying the third device is obtained from the third device as the third device connects to the local gateway;

determine a second data distribution rule using the device data identifying the first device and the second device and the updated device data identifying the third device;

assign the second data distribution rule to the data plan profile associated with the local gateway; and send additional response data to the local gateway according to the second data distribution rule, wherein the additional response data is distributed to the first device, the second device, and the third device based on the second data distribution rule.

14. The computerized method of claim 8, wherein determining the first data distribution rule to reserve the bandwidth for the distribution of the response data to the first device includes:

providing the device data to a machine learning (ML)-trained model; and generating, with the ML-trained model, the first data distribution rule using the device data as input.

15. A computer storage medium that has computer-executable instructions that, upon execution by a processor, cause the processor to at least:

obtain device data from a local gateway, wherein the device data identifies a first device and a second device associated with the local gateway;

remove personal identifiable information from the device data;

determine a first data distribution rule to prioritize distribution of response data to a higher priority device associated with the local gateway;

assign the first data distribution rule to a data plan profile associated with the local gateway;

send the response data to the local gateway according to the first data distribution rule in response to a data request from the higher priority device, wherein the response data to the data request sent to the higher priority device via the local gateway is prioritized over other response data sent to the local gateway; and dynamically update the first data distribution rule based on a change in the device data, wherein the change in the device data includes determining from network data, an occurrence of a contention event.

16. The computer storage medium of claim 15, wherein the device data includes information indicating data uses by the higher priority device; and wherein determining the first data distribution rule to prioritize the distribution of the response data to the higher priority device includes determining that the higher priority device uses data at a higher rate than another device using the device data.

17. The computer storage medium of claim 16, wherein the device data includes one or more of device history data of the higher priority device, and configuration information of the higher priority device.

18. The computer storage medium of claim 15, wherein the computer-executable instructions, further cause the processor to at least:

obtain the network data associated with network communications to and from the local gateway;

wherein determining the first data distribution rule includes determining the first data distribution rule using the network data.

19. The computer storage medium of claim 18, wherein the network data includes data indicating a current available bandwidth of the network communications to the local gateway; and wherein the first data distribution rule includes distributing the response data to the higher priority device at a rate that is a percentage value of the current available bandwidth.

20. The computer storage medium of claim 15, wherein the computer-executable instructions, further cause the processor to at least:

obtain updated device data identifying a newly added device associated with the local gateway, the updated device data identifying the newly added device is obtained from the newly added device as the newly added device connects to the local gateway;

determine a second data distribution rule using the device data identifying the higher priority device and the updated device data identifying the newly added device;

assign the second data distribution rule to the data plan profile associated with the local gateway; and send additional response data to the local gateway according to the second data distribution rule, wherein the additional response data is distributed to the higher priority device and the newly added device based on the second data distribution rule.

* * * * *